United States Patent
Tanioka

(10) Patent No.: US 6,733,231 B2
(45) Date of Patent: May 11, 2004

(54) VAPOR TUBE STRUCTURE OF GAS TURBINE

(75) Inventor: Tadateru Tanioka, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/117,079

(22) Filed: Apr. 8, 2002

(65) Prior Publication Data

US 2002/0146317 A1 Oct. 10, 2002

(30) Foreign Application Priority Data

Apr. 10, 2001 (JP) .......................... 2001-111908

(51) Int. Cl.⁷ .............................. F01D 9/06
(52) U.S. Cl. ................. 415/114; 415/135; 285/300; 165/83
(58) Field of Search .............. 415/114, 116, 415/135, 115; 165/83; 285/300, 299

(56) References Cited

U.S. PATENT DOCUMENTS 3,864,056 A * 2/1975 Gabriel et al. ............. 415/178
4,317,646 A * 3/1982 Steel et al. .................. 415/116
4,596,116 A * 6/1986 Mandet et al. ............. 60/39.07
6,105,363 A * 8/2000 Hultgren et al. ........... 60/39.75
6,224,328 B1 * 5/2001 Weigand et al. ............ 415/115

FOREIGN PATENT DOCUMENTS

| JP | 10-306702 | 11/1998 |
| JP | 10-317904 | 12/1998 |
| JP | 11-182205 | 7/1999 |
| JP | 2000-353944 | 11/2000 |
| JP | 2001-329857 | 11/2001 |

* cited by examiner

Primary Examiner—Edward K. Look
Assistant Examiner—J. M McAleenan
(74) Attorney, Agent, or Firm—Oblon, Spivak, McClelland, Maier & Neustadt, P.C.

(57) ABSTRACT

A vapor tube structure in a gas turbine comprises first connecting tubes fixed to a casing, second connecting tubes fixed to a blade ring, a recovery ring and a cooling recovery ring, a bellows tube of the flexible structure, springs, a tube and a piston rings provided between the first connecting tubes and the second connecting tubes. As a result, it is possible to absorb and follow the thermal expansion/contraction difference and prevent leaking of vapor.

4 Claims, 12 Drawing Sheets

VAPOR TUBE STRUCTURE OF GAS TURBINE

FIELD OF THE INVENTION

The present invention relates to a vapor tube structure in a gas turbine disposed between a casing and a member-to-be-supported such as a blade ring supported by the casing. More particularly, this invention relates to a vapor tube structure in a gas turbine capable of absorbing and following thermal expansion/contraction difference between a casing and a member-to-be-supported.

BACKGROUND OF THE INVENTION

In gas turbines of recent years, a structure f or cooling stationary blades is employed for enhancing efficiency. As a refrigerant for cooling the stationary blades, vapor is used. As a gas turbine of this kind, there is one described in Japanese Patent Application Laid-open No. 11-182205 filed by the present applicant. The gas turbine described in this publication will be explained below with reference to FIG. 12 and FIG. 13.

In FIG. 12, a reference number 100 represents a blade ring. The blade ring 100 is supported by a casing (not shown). The blade ring 100 comprises semi-annular shaped members which are combined with each other into an annular shape such that they can be detached in the vertical direction. In the blade ring 100, a plurality of (e.g., 32) front stage stationary blades (e.g., first stage stationary blades) 101 and rear stage stationary blades (e.g., second stage stationary blades) 102 which are arranged in a form of a ring. In some of the vapor tube structures in the gas turbine, third stage stationary blades, fourth stage stationary blades, fifth stage stationary blades, and so on are arranged in a form of a ring.

The blade ring 100 is of an integral structure integrally comprising a portion where the front stage stationary blades 101 are arranged and a portion where the rear stage stationary blades 102 are arranged. In addition to the blade ring integral structure, as a vapor tube structure in the gas turbine, there exists a blade ring separate type structure in which a blade ring having front stage stationary blades and a blade ring having rear stage stationary blades are separately formed and the blade ring on the side of the first stage stationary blade and the blade ring on the side of the rear stage stationary blade are connected to each other through a separate member.

The blade ring 100 is provided therein with a vapor supply passage 103, a vapor communication passage 104 and a vapor recovery passage 105. Vapor tubes (not shown) are respectively connected to the vapor supply passage 103 and the vapor recovery passage 105. On the other hand, the vapor tube is fixed to the casing. As a result, the vapor tube is disposed between the casing and the blade ring 100 as the member-to-be-supported. The vapor supply passage 103, the vapor communication passage 104 and the vapor recovery passage 105 are provided at least one each for the semi-annular shaped blade ring 100. On the other hand, in the plurality of front stage stationary blades 101 and the rear stage stationary blades 102, cooling vapor passages 106 and 107 are provided, respectively.

A first branch tube 108, a second branch tube 109, a third branch tube 110, a fourth branch tube 111 are respectively disposed between the vapor supply passage 103 and the cooling vapor passage 106 of the plurality of front stage stationary blades 101, between the vapor communication passage 104 and the cooling vapor passage 106 of the plurality of front stage stationary blades 101, between the vapor communication passage 104 and the cooling vapor passage 107 of the plurality of rear stage stationary blades 102, and between the vapor recovery passage 105 and the cooling vapor passage 107 of the plurality of the rear stage stationary blade 102.

A rotor (not shown) is rotatably mounted to the casing, and rotor blades (e.g., first stage rotor blades) 112 are annularly arranged.

The rotor blade 112 is arranged downstream from the stationary blades 101 and 102. The rotor blade 112 is arranged between the front stage stationary blade 101 and the rear stage stationary blade 102. A chip of the rotation side rotor blade 112 is opposed to the fixed side blade ring 100 through a clearance 113. It is important maintain the clearance 113 uniformly so as to enhance the efficiency of the gas turbine.

If the gas turbine is actuated, high temperature and high pressure combustion gas (not shown) passes through the front stage stationary blade 101, the rotor blade 112 and the rear stage stationary blade 102 to rotate the rotor blade 112 and the rotor side, thereby obtaining motive power.

Cooling vapor shown with solid arrows in FIG. 12 is supplied to the vapor supply passage 103 through the vapor tube. Then, the cooling vapor is distributed to cooling vapor passages 106 of the plurality of front stage stationary blades 101 from the vapor supply passage 103 through the first branch tube 108. The distributed cooling vapors passes through the cooling vapor passages 106 to cool the plurality of front stage stationary blades 101.

The cooling vapors which cooled the front stage stationary blades 101 pass through the second branch tube 109 and are collected into the vapor communication passage 104, and from the vapor communication passage 104, the vapors pass the third branch tube 110 and are again distributed into the cooling vapor passages 107 of the plurality of rear stage stationary blades 102. The distributed cooling vapors pass through the cooling vapor passages 107 to cool the plurality of rear stage stationary blades 102.

The cooling vapors which cooled the rear stage stationary blades 102 pass the fourth branch tube 111 and are again collected into the vapor recovery passage 105, and from the vapor recovery passage 105, the vapors are recovered through the vapor tube. The recovered vapors are reused.

In the above-described prior art gas turbine, the combustion gas tends to be heated to high temperature for enhancing the efficiency. Thus, there is thermal expansion/contraction difference between the casing and the member-to-be-supported.

In the vapor tube in the above-described prior art gas turbine, however, there is no means which absorbs and follows the thermal expansion/contraction difference between the casing and the member-to-be-supported. Therefore, there is an adverse possibility that vapor may leak from the conventional vapor tube.

SUMMARY OF THE INVENTION

It is an object of the present invention to provide a vapor tube structure in the gas turbine capable of absorbing and following the thermal expansion/contraction difference between the casing and the member-to-be-supported.

The vapor tube structure according to the present invention is disposed between a casing and a member-to-be-supported supported by the casing. This vapor tube structure comprises at least one first connecting tube fixed to the casing, at least one second connecting tube fixed to the member-to-be-supported, and a flexible structure provided between the first connecting tube and the second connecting tube.

As a result, it is possible to absorb and follow the thermal expansion/contraction difference between the member-to-be-supported and the casing by the flexible structure. Thus, it is possible to prevent vapor from leaking from the vapor tube disposed between the member-to-be-supported and the casing.

Other objects and features of this invention will become apparent from the following description with reference to the accompanying drawings.

DETAILED DESCRIPTIONS

Three embodiments of the vapor tube structure in a gas turbine of the present invention will be explained with reference to accompanying drawings. The vapor tube structure in the gas turbine is not limited to these embodiments.

FIG. 1 to FIG. 8 show the vapor tube structure in a gas turbine of the first embodiment according to the present invention.

Figure 1:
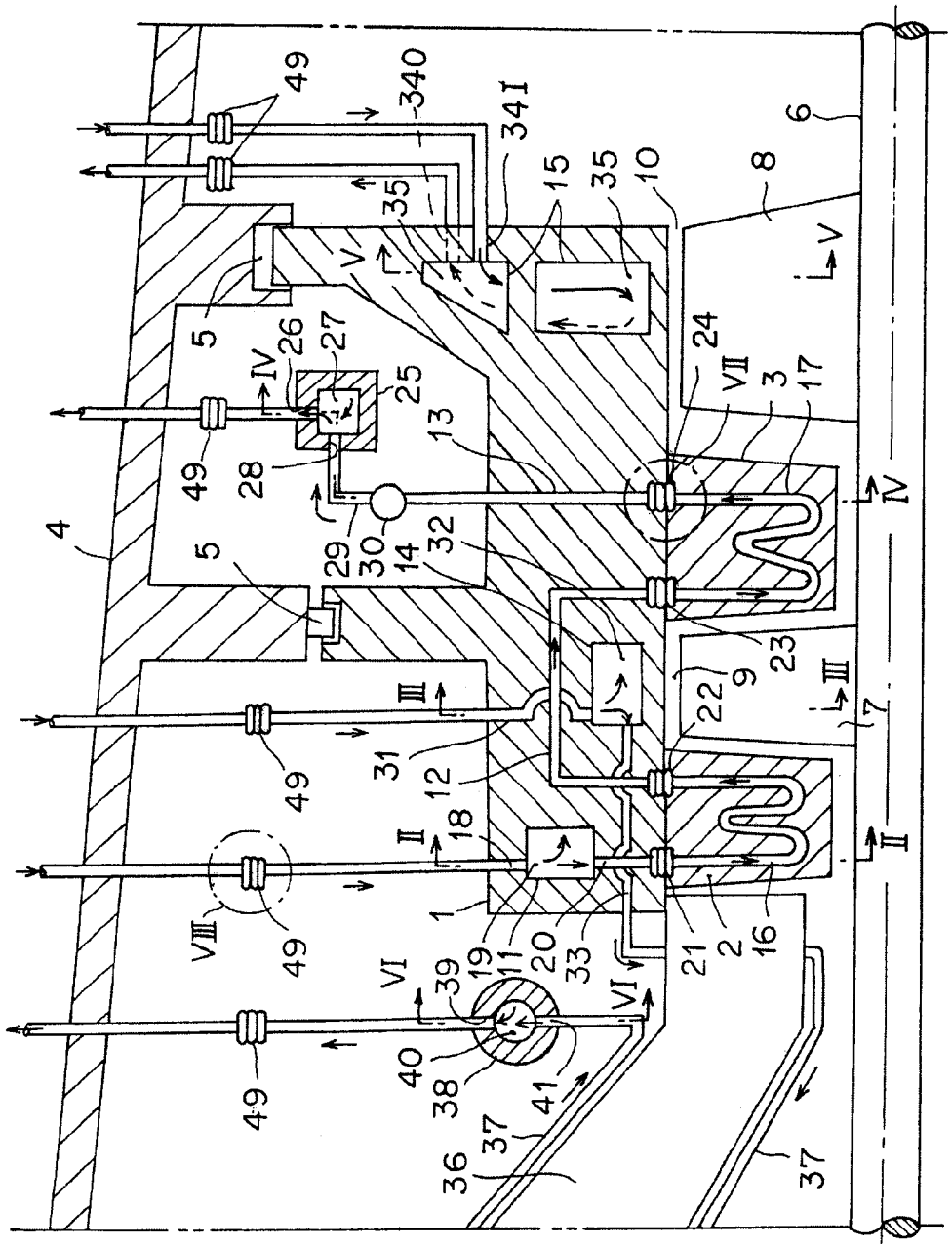
FIG. 1 is a partial vertical sectional view showing an outline of a first embodiment of a vapor tube structure in a gas turbine of the present invention.

In FIG. 1, a reference number 1 represents a blade ring. The blade ring 1 comprises semi-annular shaped members which are combined with each other into an annular shape such that they can be detached in the vertical direction. In the blade ring 1, a plurality of (e.g., 32) front stage stationary blades (e.g., first stage stationary blades) 2 and rear stage stationary blades (e.g., second stage stationary blades) 3 which are arranged in a form of a ring. In some of the vapor tube structures in the gas turbine, third stage stationary blades, fourth stage stationary blades, fifth stage stationary blades, and so no are arranged in a form of a ring.

The blade ring 1 is of an integral structure integrally comprising a portion where the front stage stationary blades 2 are arranged and a portion where the rear stage stationary blades 3 are arranged. The blade ring 1 is movably supported by a casing 4 in three directions (an axial direction of a later-described rotor 6, a diametrical direction and a circumferential direction) through supporting unit 5.

The rotor 6 is rotatably mounted to the casing 4. On the rotor 6, a front rotor blade (e.g., first stage rotor blade) 7 and a rear rotor blade (e.g., second stage rotor blade) 8 are annularly arranged. In some of vapor tube structure in the gas turbines, a third stage rotor blade, a fourth stage rotor blade, a fifth stage rotor blade, and so on are annularly arranged.

The front rotor blade 7 and the rear rotor blade 8 are arranged downstream from the front stage stationary blade 2 and the rear stage stationary blade 3. Rotating side chips of the front rotor blade 7 and the rear rotor blade 8 are opposed to the fixed side blade ring 1 through clearances 9 and 10.

The blade ring 1 comprises a supply passage 11, a communication passage 12, a recovery passage 13, a warming/cooling passage 14 and a warming passage 15. Cooling passages 16 and 17 are respectively provided in the plurality of front stage stationary blades 2 and rear stage stationary blades 3.

Figure 2:
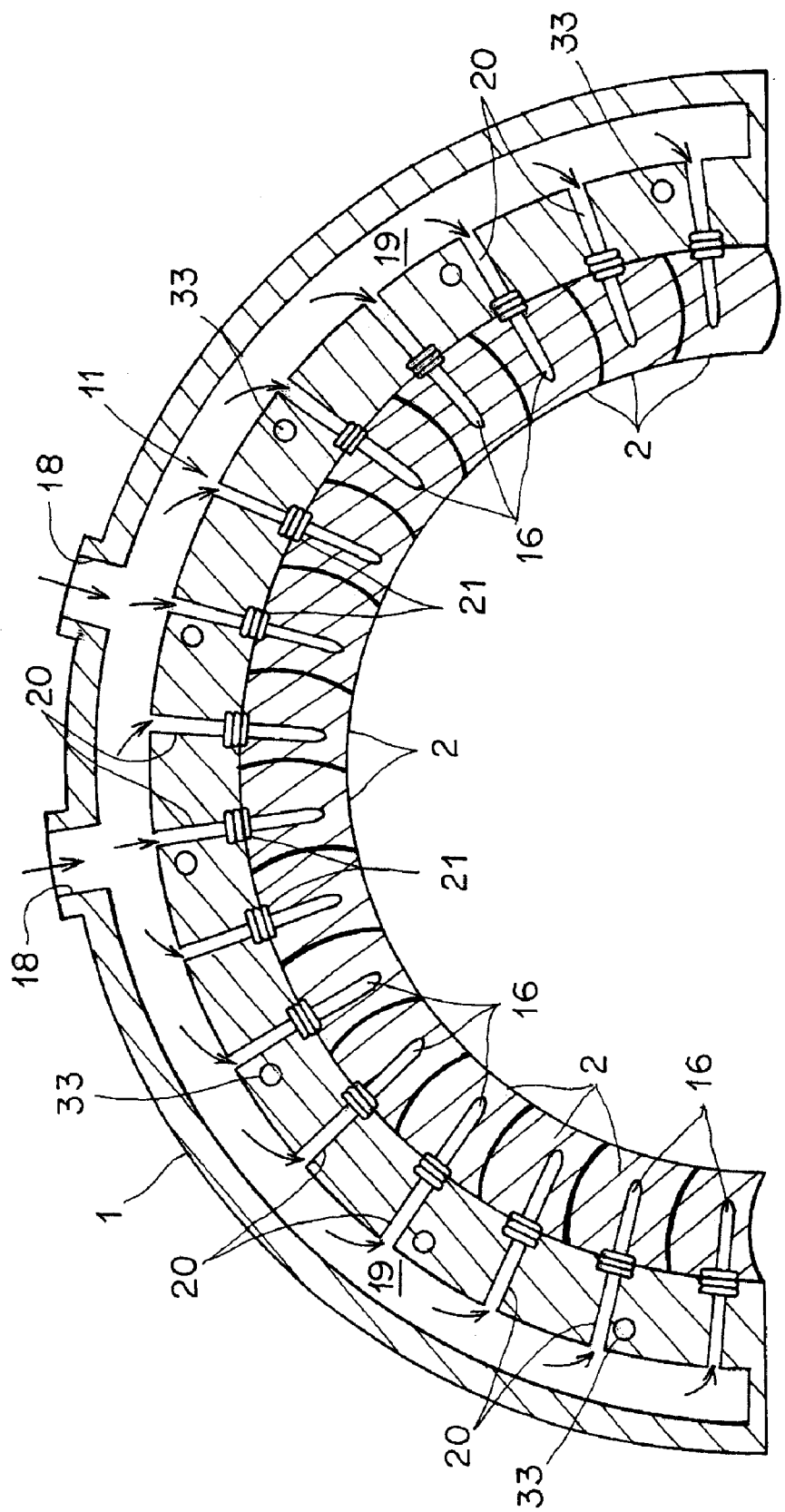
FIG. 2 is a sectional view taken along a line II—II in FIG. 1.

As shown in FIG. 2, the supply passage 11 is of a manifold structure comprising two supply port passages 18, one supply communication passage 19 and 16 supply branch passages 20 provided in the semi-annular shaped blade ring 1. The supply branch passages 20 and the cooling passages 16 of the front stage stationary blades 2 are connected to each other through the first flexible connecting tubes 21.

Figure 3:
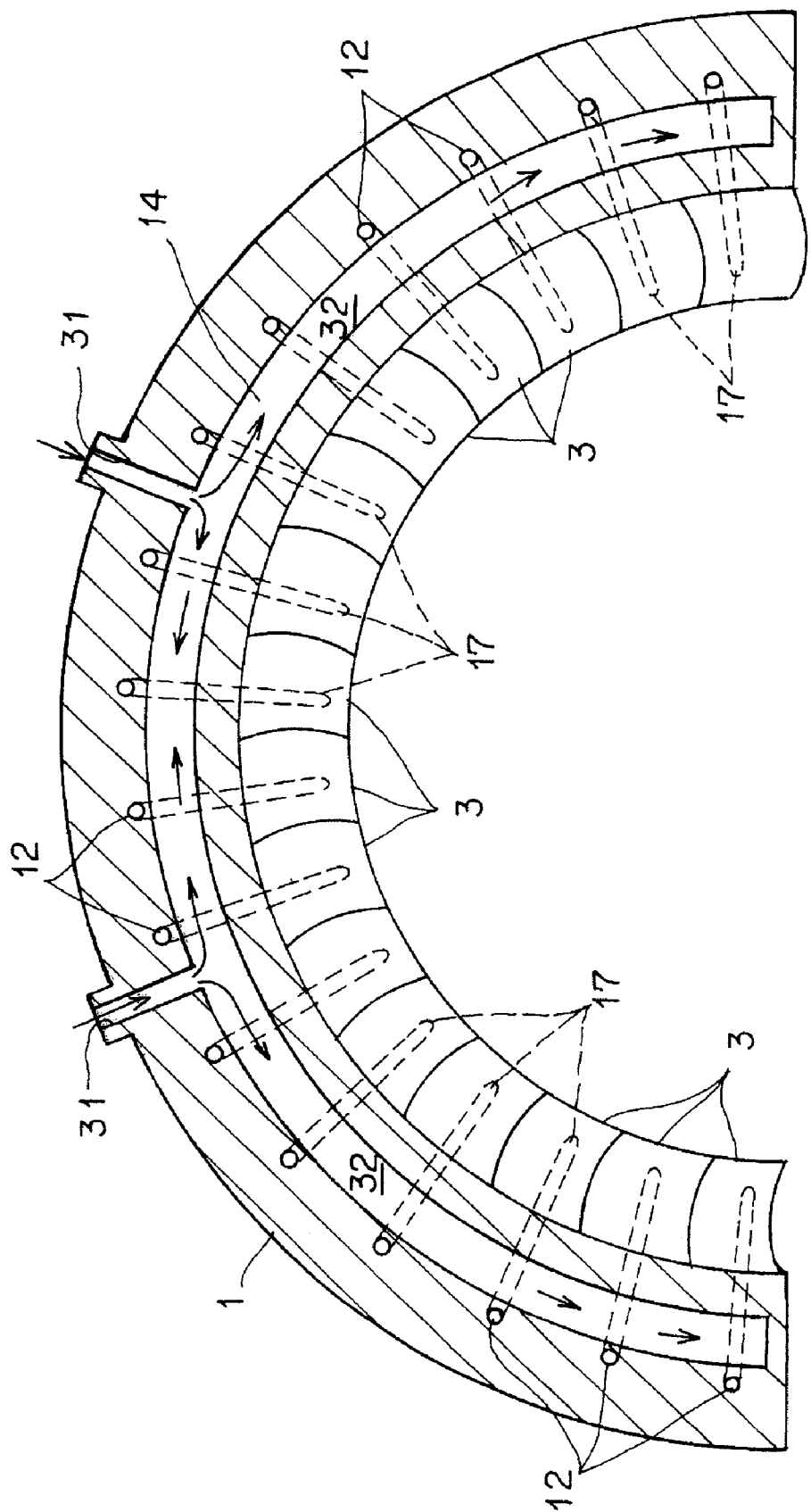
FIG. 3 is a sectional view taken along a line III—III in FIG. 1.

As shown in FIG. 3, 16 communication passages 12 are provided in the semi-annular shaped blade ring 1. The communication passages 12 and the cooling passages 16 of the front stage stationary blades 2 are connected to each other through second flexible connecting tubes 22. The communication passages 12 and the cooling passages 17 of the rear stage stationary blades 3 are connected to each other through the third flexible connecting tube 23. As the result, the cooling passages 16 of the plurality of front stage stationary blades 2 and the cooling passages 17 of the plurality of rear stage stationary blades 3 are brought into communication with each other one by one through the communication passages 12, respectively. This is so-called one through structure.

Figure 4:
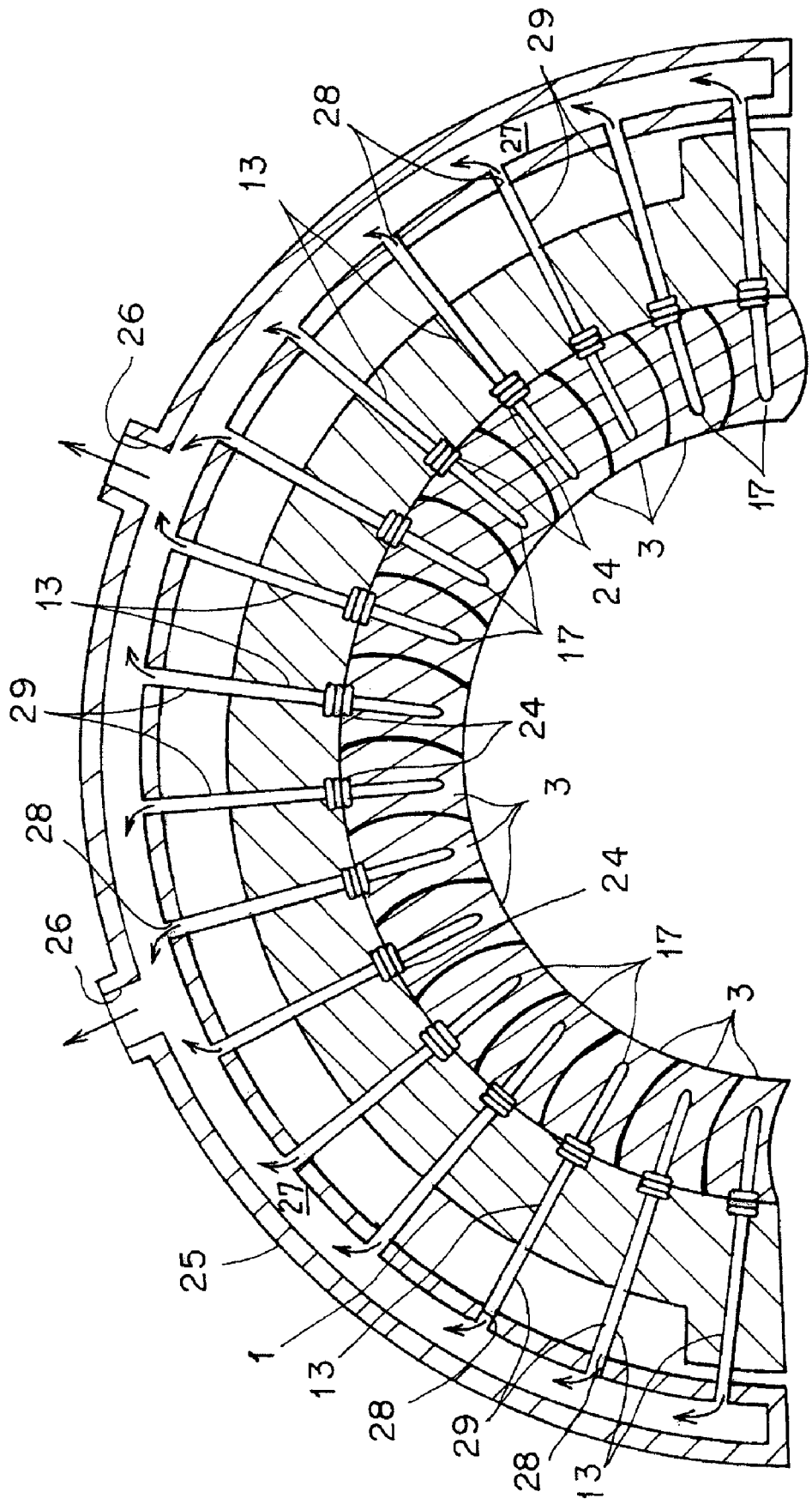
FIG. 4 is a sectional view taken along a line IV—IV in FIG. 1.

As shown in FIG. 4, 16 recovery passages 13 are provided in the semi-annular shaped blade ring 1. The recovery passages 13 and the cooling passages 17 of the rear stage stationary blades 3 are connected to each other through fourth flexible connecting tubes 24.

As shown in FIG. 1, a recovery ring 25 is disposed on an outer periphery of the blade ring 1. The recovery ring 25 comprises semi-annular shaped members which are combined with each other into an annular shape such that they can be detached in the vertical direction. As shown in FIG. 4, the recovery ring 25 is of a manifold structure comprising two recovery port passages 26, one recovery communication passage 27 and 16 recovery branch passages 28 with respect to the semi-annular shaped members.

The recovery passages 13 and the recovery branch passages 28 are connected to each other through recovery tubes 29, respectively. Temperature measuring units 30 are respectively provided with the recovery tube 29. As a result, one passage (recovery tube 29) connects the cooling passage 16 of the one front stage stationary blade 2, the one communication passage 12 and the cooling passage 17 of the one rear stage stationary blade 3 to each other, and the temperature measuring unit 30 is provided in each the passage.

As shown in FIG. 2 and FIG. 3, the warming/cooling passage 14 is of a manifold structure comprising two warming/cooling port passages 31, one warming/cooling communication passage (warming passage) 32 and eight warming/cooling branch passages 33 provided in the semi-annular shaped blade ring 1. The warming/cooling communication passage 32 is provided in the blade ring 1 at a location opposed to the front rotor blade 7.

Figure 5:
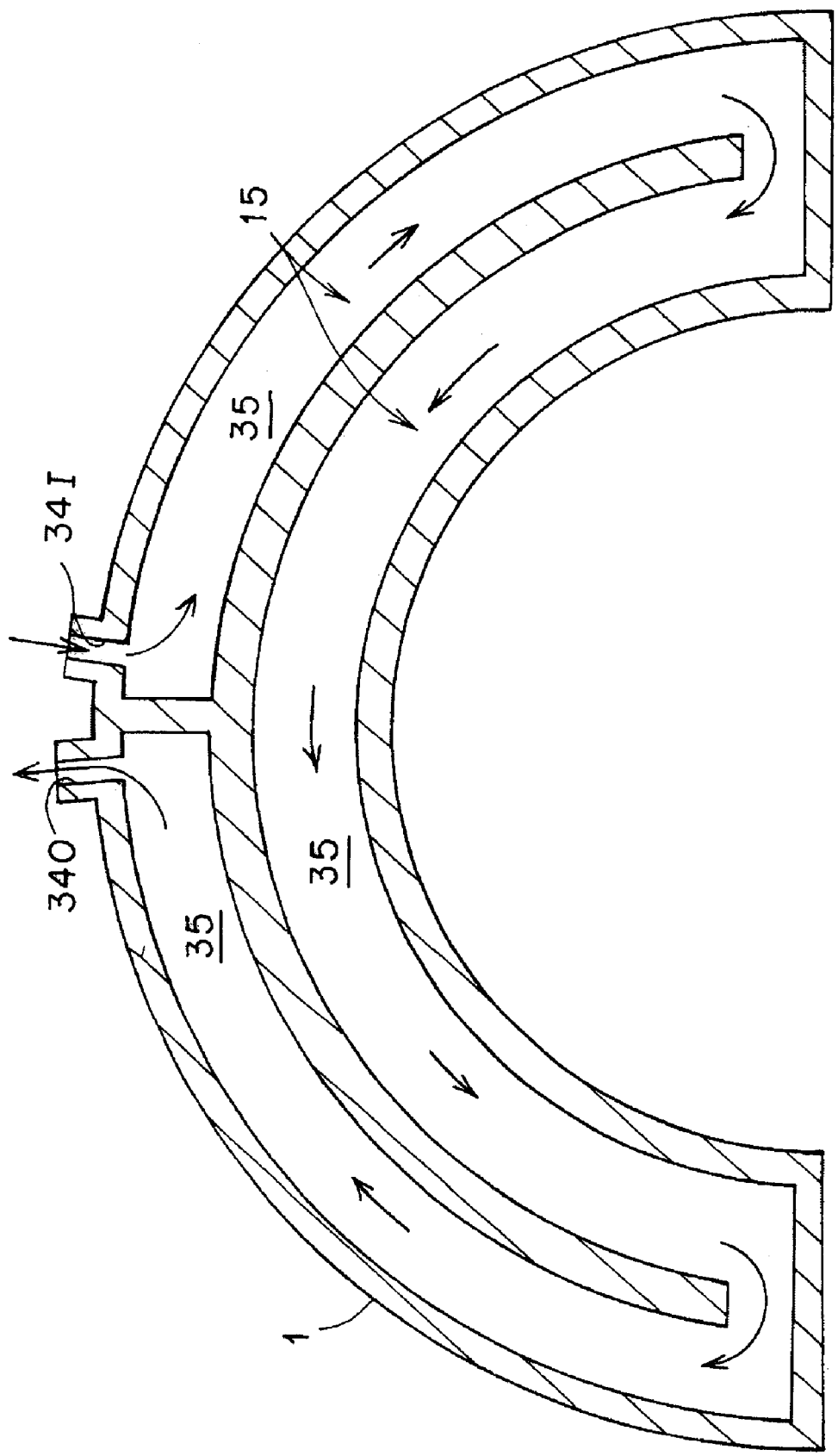
FIG. 5 is a sectional view taken along a line V—V in FIG. 1.

As shown in FIG. 5, the warming passage 15 is of a manifold structure comprising one warming inlet passage 34I, one warming outlet passage 34O and one warming communication passage (warming passage) 35 provided in the semi-annular shaped blade ring 1. The warming communication passage 35 is provided in the blade ring 1 at a location opposed to the rear rotor blade 8.

In FIG. 1, a reference number 36 represents a transition pipe of a combustor (not shown). In front of the front stage stationary blade 2, 16 transition pipes 36 are disposed annularly. A cooling tube (cooling passage) 37 is connected to each of the transition pipes 36. Each cooling tube 37 and each warming/cooling branch passage 33 are connected to each other.

Figure 6:
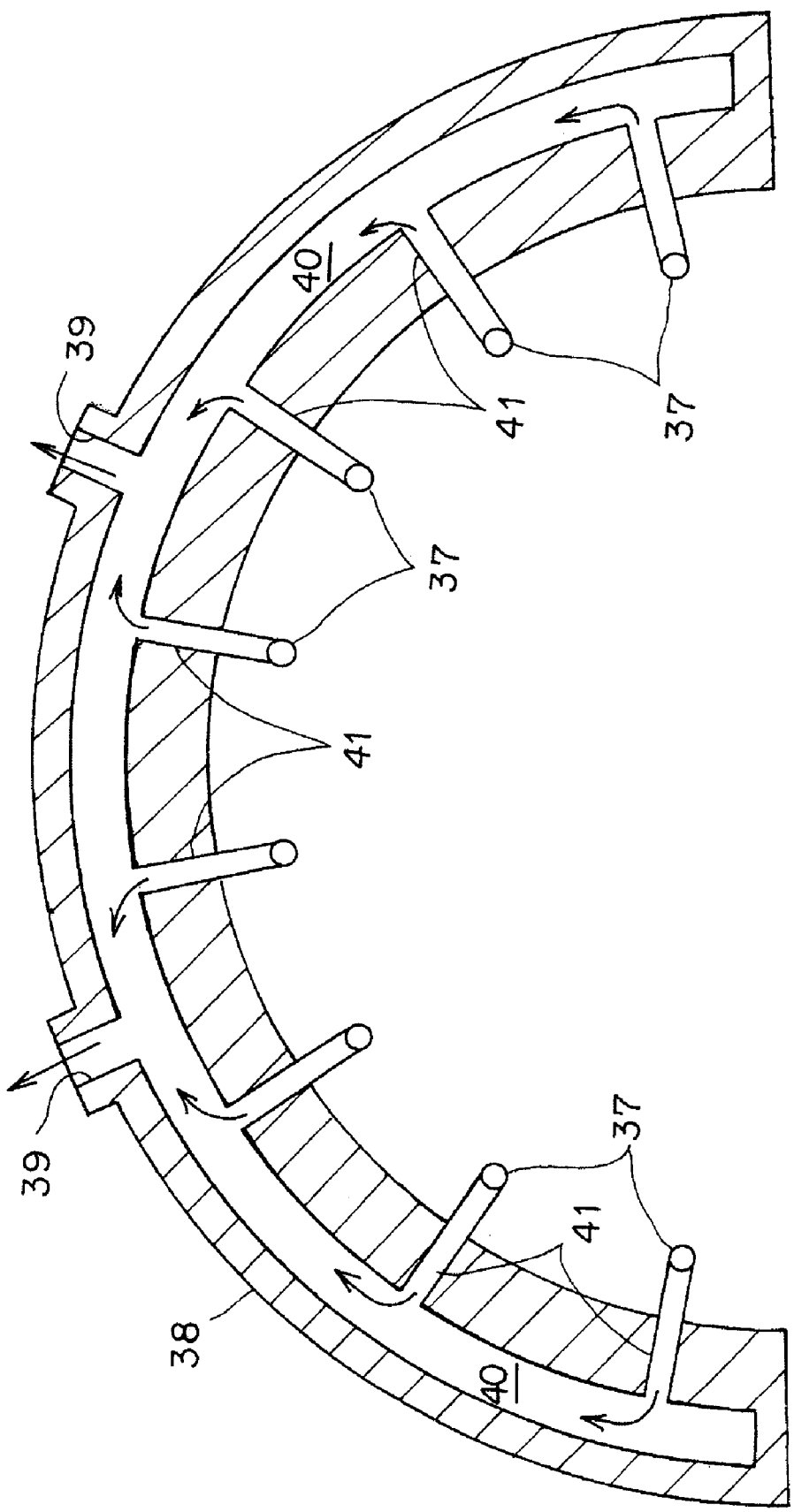
FIG. 6 is a sectional view taken along a line VI—VI in FIG. 1.

As shown in FIG. 1, a cooling recovery ring 38 is disposed on an outer periphery of the blade ring 1. The cooling recovery ring 38 comprises semi-annular shaped members which are combined with each other into an annular shape such that they can be detached in the vertical direction. As shown in FIG. 6, the cooling recovery ring 38 is of a manifold structure comprising two cooling recovery port passages 39, one cooling recovery communication passage 40 and eight cooling recovery branch passages 41 provided in the semi-annular shape. The cooling recovery branch passage 41 and the cooling tube 37 are connected each other.

Figure 7:
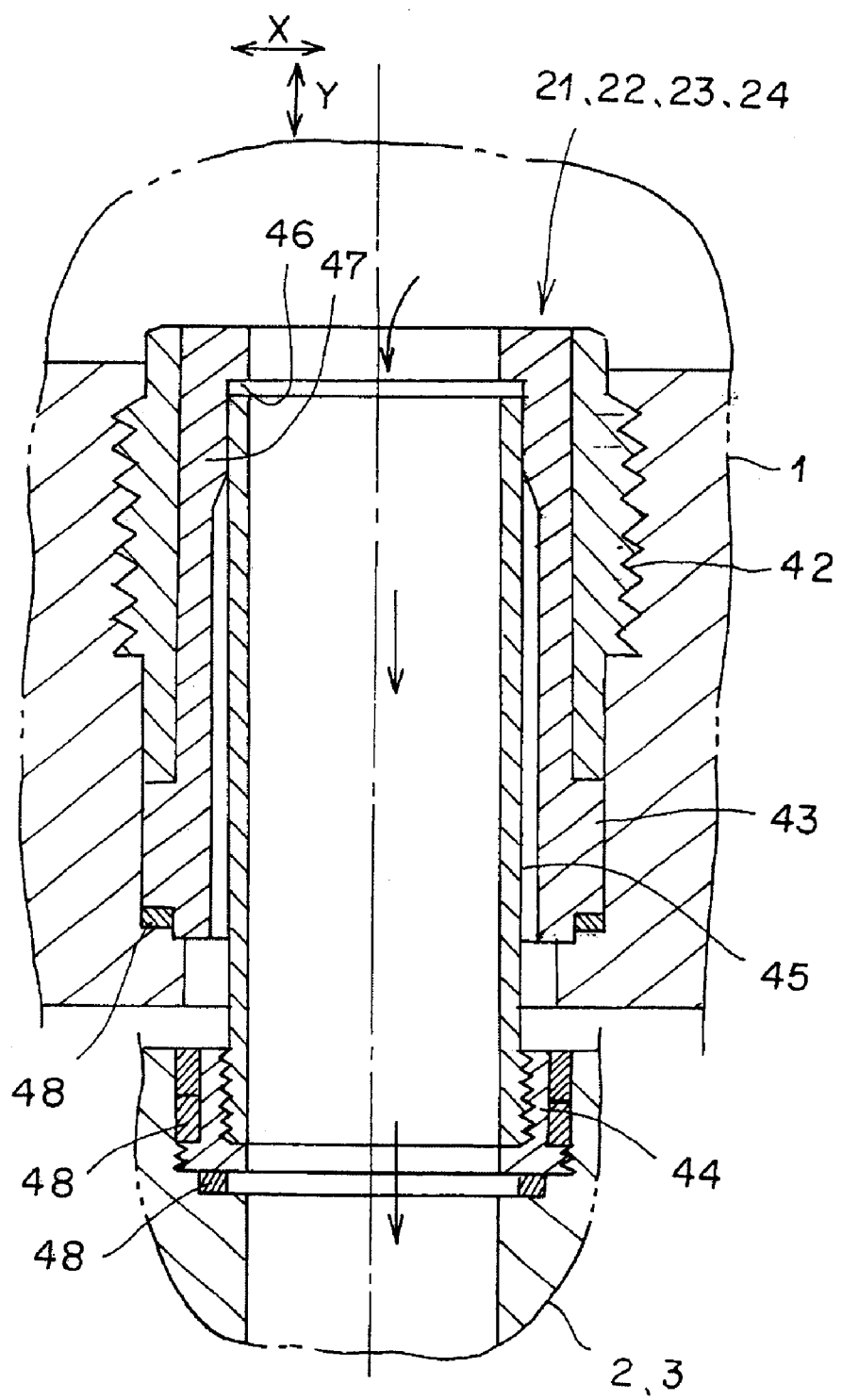
FIG. 7 is a sectional view of a flexible tube of a VII portion in FIG. 1.

As shown in FIG. 7, each of the first to fourth flexible tubes 21 to 24 includes a first screw tube 42 screwed into the blade ring 1, an outer tube 43 fixed to the blade ring 1 by the first screw tube 42, a second screw tube 44 screwed into the front stage stationary blade 2 and the rear stage stationary blade 3, and an inner tube 45 screwed into the second screw tube 44.

An abutting projection 47 is provided on an inner surface of one end of the outer tube 43 through a step 46. The abutting projection 47 of the outer tube 43 and an outer surface of the inner tube 45 are brought into air-tight abutment. Metal seals (metal gaskets) 48 are interposed between the outer tube 43 and the blade ring 1, and between the second screw tube 44 and the front stage stationary blade 2 and the rear stage stationary blade 3.

Vapor tubes 49 of flexible structure are provided between the blade ring 1 and the casing 4. That is, the vapor tubes 49 are connected to the four supply port passages 18 on the side of the blade ring 1, the four warming/cooling port passages 31, the two warming inlet passages 34I, two warming outlet passages 34O, the four recovery communication passages 27 on the side of the recovery ring 25, the four cooling recovery port passages 39 on the side of the cooling recovery ring 38.

Figure 8:
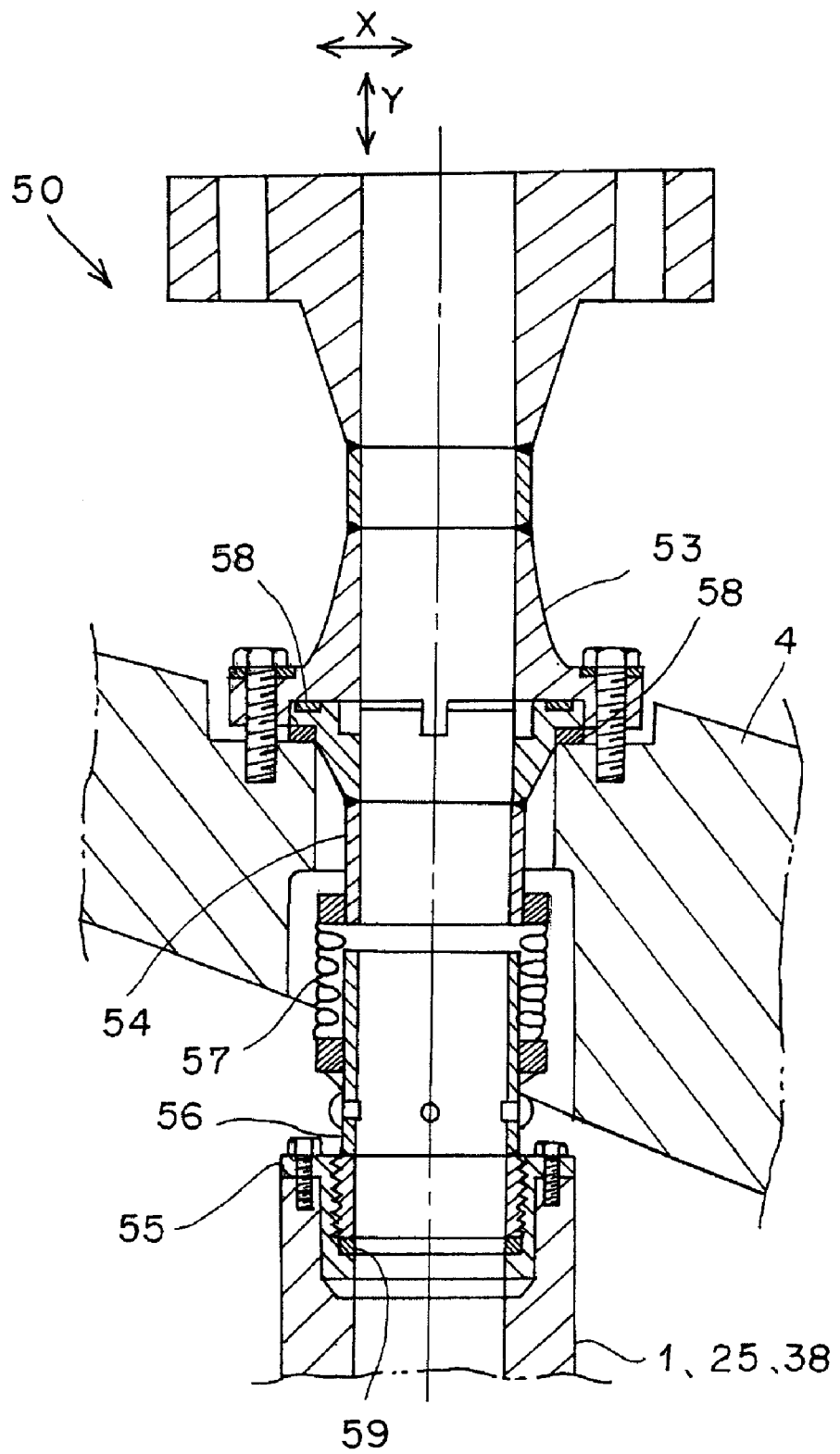
FIG. 8 is a sectional view of a flexible tube of a bellows structure of a VIII portion in FIG. 1.

Each the vapor tube 49 comprises a bellows structure 50 shown in FIG. 8. The vapor tube 50 of the bellows structure comprises a fixing tube 53 fixed to the casing 4 by a bolt, a first connecting tube 54 fixed to the casing 4 by the fixing tube 53, a screw tube 55 fixed to the port passages 18, 31, 34I, 34O, 27 and 39 of the blade ring 1, the recovery ring 25, and the cooling recovery ring 38 by bolts, a second connecting tube 56 screwed into the screw tube 55, and a bellows tube 57 of a flexible structure whose opposite ends are respectively fixed to the first connecting tube 54 and the second connecting tube 56.

The fixing tube 53 comprises three tubes welded to each other. The fixing tube 53 is connected to a vapor supply source such as a boiler and a vapor recovery source through tubes. The first connecting tube 54 comprises two tubes welded to each other. Metal seals (metal gaskets) 58 are interposed between the first connecting tube 54 and the casing 4 and between the first connecting tube 54 and the fixing tube 53. The second connecting tube 56 comprises two tubes welded to each other. A metal seals (metal gaskets) 59 having C-shaped cross section is interposed between the second connecting tube 56 and the screw tube 55.

The operation of the vapor tube structure will now be explained. Cooling vapor shown with solid arrows in the drawings is supplied to the supply passage 11 through the vapor tubes 49 (vapor tubes 50 of bellows structure). Then, as shown in FIG. 1 and FIG. 2, the cooling vapor is branched at the supply port passages 18, the supply communication passage 19 and the supply branch passages 20 of the supply passage 11, and the branched vapors pass through the first flexible connecting tubes 21 and distributed to the cooling passages 16 of the plurality of the front stage stationary blade 2. The distributed cooling vapors pass through the cooling passages 16 for cooling the plurality of front stage stationary blades.

As shown in FIG. 1 and FIG. 3, the cooling vapors which cooled the front stage stationary blade 2 pass through the second flexible connecting tube 22, communication passage 12 of one through structure and the third flexible connecting tube 23, and distributed to the cooling passage 17 of the plurality of the rear stage stationary blades 3. The distributed cooling vapors pass through the cooling passages 17 for cooling the plurality of rear stage stationary blades 3.

As shown in FIG. 1 and FIG. 4, the cooling vapors which cooled the rear stage stationary blades 3 are collected by the fourth flexible connecting tube 24, the recovery passage 13, the recovery tube 29, the recovery branch passage 28 and the recovery communication passage 27, and collected through the recovery port passage 26 and the vapor tubes 49 (vapor tubes 50 of bellows structure). The collected vapors are reused.

During warm-up operation, warming vapor shown with solid arrows in the drawings is supplied to the warming/cooling passage 14 through the vapor tubes 49 (vapor tube 50 of the bellows structure). Then, as shown in FIG. 1 to FIG. 3, the warming vapor is supplied to the warming/cooling communication passage 32 through the warming/cooling port passages 31. A peripheral portion of the warming/cooling communication passage 32, i.e., a portion of the blade ring 1 opposed to the front rotor blade 7 is warmed, and the clearance 9 between the blade ring 1 and the front rotor blade 7 is maintained. Therefore, during the warm-up operation, and a so-called hugging in which the blade ring 1 is contracted and brought into contact with the front rotor blade 7 can be prevented.

On the other hand, during rating operation, cooling vapor shown with solid arrows in the drawings is supplied to the warming/cooling passage 14 through the vapor tubes 49 (vapor tube 50 of the bellows structure). Then, as shown in FIG. 1 to FIG. 3, the cooling vapor is supplied to the warming/cooling communication passage 32 through the warming/cooling port passages 31. A peripheral portion of the warming/cooling communication passage 32, i.e., a portion of the blade ring 1 opposed to the front rotor blade 7 is cooled, and the clearance 9 between the blade ring 1 and the front rotor blade 7 is maintained. Therefore, during rating operation, the blade ring 1 is expanded, the clearance 9 between the blade ring 1 and the front rotor blade 7 is increased, and it is possible to prevent the turbine efficiency from being lowered.

Then, as shown in FIG. 1, FIG. 2 and FIG. 6, the vapor supplied to the warming/cooling communication passage 32 is branched at the warming/cooling branch passages 33 and supplied to the cooling tube 37, and the vapors cool the transition pipe 36. The vapors which cooled the transition pipe 36 are collected by the cooling tube 37, the cooling recovery branch passages 41 and the cooling recovery communication passage 40, and recovered through the cooling recovery port passages 39 and the vapor tubes 49 (vapor tube 50 of the bellows structure). The recovered vapor is reused.

Further, during the warm-up operation, the warming vapor shown with the solid arrows in the drawings is supplied to the warming passage 15 through the vapor tube 49 (vapor tube 50 of bellows structure). Then, as shown in FIG. 1 and FIG. 5, the warming vapor is supplied to the warming communication passage 35 through the warming inlet passage 34I. A peripheral portion of the warming communication passage 35, i.e., a portion of the blade ring 1 opposed to the rear rotor blade 8 is warmed, and the clearance 10 between the blade ring 1 and the rear rotor blade 8 is maintained. Therefore, during the warm-up operation, and a so-called hugging in which the blade ring 1 is contracted and brought into contact with the rear rotor blade 8 can be prevented.

On the other hand, during the rating operation, the cooling vapor shown with the solid arrows in the drawings is supplied to the warming passage 15 through the vapor tube 49 (vapor tube 50 of bellows structure). Then, as shown in FIG. 1 and FIG. 5, the cooling vapor is supplied to the warming communication passage 35 through the warming inlet passage 34I. A peripheral portion of the warming communication passage 35, i.e., a portion of the blade ring 1 opposed to the rear rotor blade 8 is cooled, and the clearance 10 between the blade ring 1 and the rear rotor blade 8 is maintained. Therefore, during rating operation, the blade ring 1 is expanded, the clearance 10 between the blade ring 1 and the rear rotor blade 8 is increased, and it is possible to prevent the turbine efficiency from being lowered.

The vapor supplied to the warming communication passage 35 is recovered through the warming outlet passage 34O and the vapor tube 49 (vapor tube 50 of bellows structure). The recovered vapor is reused.

Effects achieved by the vapor tube structure in the gas turbine of the first embodiment will now be explained. In the vapor tube structure in the gas turbine of the first embodiment, the vapor tubes 49 disposed between the casing 4 and the member-to-be-supported (the blade ring 1, the recovery ring 25 and the cooling recovery ring 38) is of a flexible structure, i.e., is a vapor tube 50 of bellows structure. Therefore, it is possible to absorb and follow the thermal expansion/contraction difference between the casing 4 and the member-to-be-supported (the blade ring 1, the recovery ring 25 and the cooling recovery ring 38) by the vapor tubes 49 (vapor tube 50 of bellows structure). As a result, it is possible to prevent vapor from leaking between the casing 4 and the member-to-be-supported (the blade ring 1, the recovery ring 25 and the cooling recovery ring 38).

Especially, according to the vapor tube 50 of bellows structure of the first embodiment, it is possible to absorb and follow the thermal expansion/contraction difference in an axial direction of the rotor 6 (diametrical direction of the vapor tube 50) X, a diametrical direction of the rotor 6 (axial direction of the vapor tube 50) Y and a circumferential direction of the rotor 6 (diametrical direction of the vapor tube 50 and direction perpendicular to a paper sheet of FIG. 8) by means of the bellows tube 57 interposed between the first connecting tube 54 fixed to the casing 4 and the second connecting tube 56 fixed to the member-to-be-supported (blade ring 1, recovery ring 25, cooling recovery ring 38). Therefore, it is possible to prevent vapor from leaking from the vapor tubes 49 (50) disposed between the casing and the member-to-be-supported (blade ring 1, recovery ring 25, cooling recovery ring 38).

In the first embodiment, since the vapor tube 50 of bellows structure comprises at least the first connecting tube 54, the second connecting tube 56 and the bellows tube 57, a structure of the vapor tube 50 is simple.

Furthermore, even if the blade ring 1 of the member-to-be-supported is a blade ring of integral structure which is adversely prone to be largely affected by thermal deformation, it is possible to reliably absorb and follow the thermal expansion/contraction difference between the casing 4 and the blade ring 1, and to reliably prevent vapor from leaking from the vapor tubes 49 (50).

The number of communication passages 12 is 32 which is the same as that of each of the front stage stationary blades 2 and the rear stage stationary blades 3, which means the large number of communication passages 12 are densely disposed in the blade ring 1. Therefore, a temperature difference between a portion of the blade ring 1 having the communication passages 12 and a portion of the blade ring 1 having no communication passage 12 is small. Due to the uniform temperature distribution having small temperature difference, the thermal deformation of the blade ring 1 is reduced, and the clearances 9 and 10 between the front rotor blade 7 and the rear rotor blade 8 of the fixed side and rotating side such as the blade ring 1 become uniform.

Even if the blade ring 1 is of integral structure which is adversely prone to be largely affected by thermal deformation, thermal deformation of the blade ring 1 of the integral structure is small, and the clearances 9 and 10 between the blade ring 1 of the integral structure, the front rotor blade 7 and the rear rotor blade 8 become uniform.

The one passage (so-called one through) connecting the cooling passage 16 of the one front stage stationary blade 2, the one communication passage 12 and the cooling passage 17 of the one rear stage stationary blade 3 to each other is provided with the temperature measuring unit 30. As a result, it is possible to detect a temperature abnormality of the front stage stationary blade 2, the rear stage stationary blade 3, the cooling passage 16 of the front stage stationary blade 2, the communication passage 12 and the cooling passage 17 of the front stage stationary blade 2, for example, it is possible to detect deformation, breakage, damage of the stationary blades 2 and 3, and leakage and clogging of the passages 16, 12 and 17.

A group comprising the supply passage 11, the communication passage 12 and the recovery passage 13 of the blade ring 1, and a group comprising the cooling passages 16 and 17 of the plurality of front stage stationary blades 2 and rear stage stationary blades 3 are connected to each other through the first to fourth flexible tubes 21 to 24. As a result, in the first embodiment, it is possible to absorb and follow the thermal expansion/contraction difference between the blade ring 1, the front stage stationary blade 2 and the rear stage stationary blade 3 by the first to fourth flexible tubes 21 to 24. Therefore, it is possible to prevent vapor from leaking between the blade ring 1, the front stage stationary blade 2 and the rear stage stationary blade 3.

Because the abutting projection 47 of the outer tube 43 abuts against the outer surface of the inner tube 45 airtightly, it is possible to absorb and follow the thermal expansion/contraction difference in the axial direction of the rotor 6 (diametrical direction of the first to fourth flexible tubes 21 to 24) X, the diametrical direction of the rotor 6 (axial direction of the first to fourth flexible tubes 21 to 24) Y and a circumferential direction of the rotor 6 (the diametrical direction of the first to fourth flexible tubes 21 to 24, direction perpendicular to a paper sheet of FIG. 7) and a circumferential direction of the first to fourth flexible tubes 21 to 24.

The blade ring 1 is provided with the warming/cooling communication passage 32 and the warming communication passage 35. As a result, in the first embodiment, during the warm-up operation before the rating operation, if warming vapor is allowed to pass through the warming/cooling communication passage 32 and the warming communication passage 35 of the blade ring 1, it is possible to control the clearances 9 and 10 between the blade ring 1, the front rotor blade 7 and the rear rotor blade 8. Further, the cooling vapor and the warming vapor are handled as common object, vapor supply passages and recovery passages can be designed as common member, and the structure can be made compact.

The cooling tube 37 provided in the transition pipe 36 of the combustor and the warming/cooling passage 14 of the blade ring 1 are brought into communication with each other through the warming/cooling branch passages 33. As a result, cooling vapor of the transition pipe 36 and the warming vapor of the blade ring 1 are handled as common object, vapor supply passages and recovery passages can be designed as common member, and the vapor tube structure in the gas turbine can be made compact.

Figure 9:
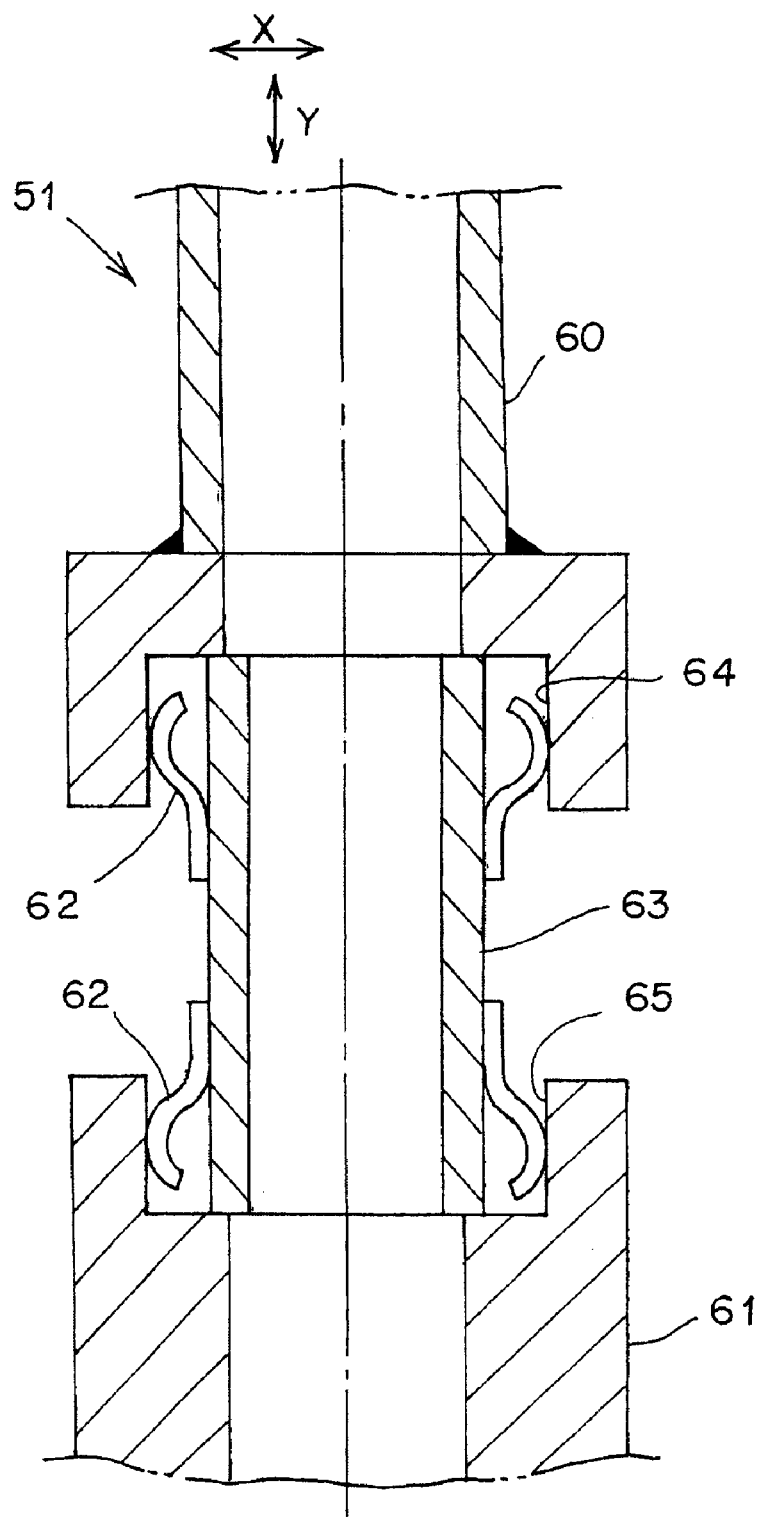
FIG. 9 is a partial sectional view showing an outline of a second embodiment of the vapor tube structure in the gas turbine of the invention.

FIG. 9 is a partial sectional view of the vapor tube structure in a gas turbine of the second embodiment according to the present invention.

A vapor tube 49 of the second embodiment is a vapor tube 51 whose flexible structure is a tube seal structure. The vapor tube 51 of the tube seal structure comprises a first connecting tube 60 fixed to the casing 4, a second connecting tube 61 fixed to the blade ring 1, the recovery ring 25, and the cooling recovery ring 38, and a tube 63 whose opposite ends are fixed to the first connecting tube 60 and the second connecting tube 61 through springs 62.

The first connecting tube 60 and the second connecting tube 61 are provided with recesses 64 and 65, respectively. The springs 62 are fixed to outer peripheries of opposite ends of the tube 63. The springs 62 resiliently abut against an inner surface of the recess 64 of the first connecting tube 60 and an inner surface of the recess 65 of the second connecting tube 61.

In the vapor tube 51 of the tube seal structure according to this second embodiment, the inner surface of the first connecting tube 60, the inner surface of the recess 66 of the springs 62 fixed to the member-to-be-supported (blade ring 1, recovery ring 25, cooling recovery ring 38) and the springs 62 of the outer surface of the tube 63 resiliently abut against each other. As a result, it is possible to absorb and follow the thermal expansion/contraction difference in an axial direction of the rotor 6 (diametrical direction of the vapor tube 51) X, a diametrical direction of the rotor 6 (axial direction of the vapor tube 51) Y and a circumferential direction of the rotor 6 (diametrical direction of the vapor tube 51 and direction perpendicular to a paper sheet of FIG. 9).

As a result, the second embodiment can achieve substantially the same working effect as that of the first embodiment.

Figure 10A:
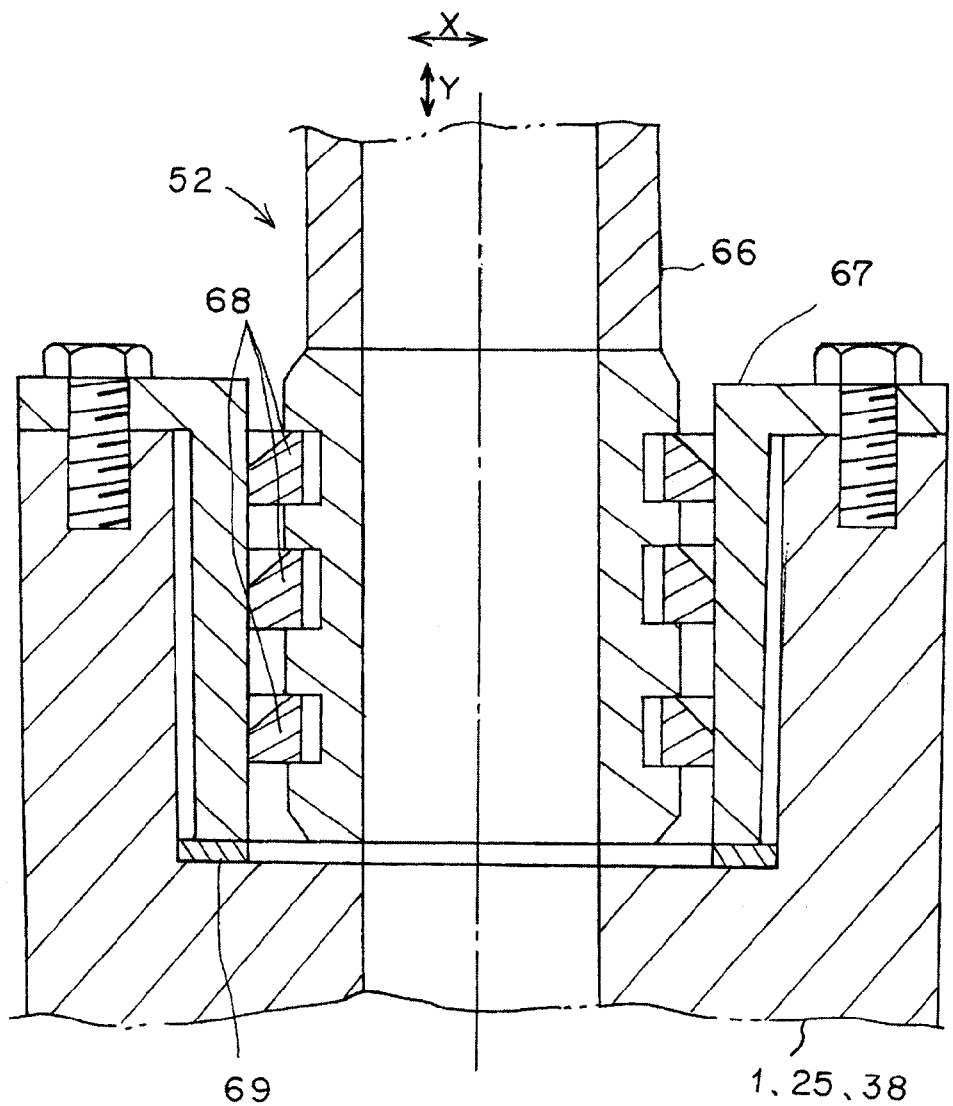
FIG. 10A is a partial vertical sectional view showing an outline of a third embodiment of the vapor tube structure in the gas turbine of the invention.
Figure 10B:
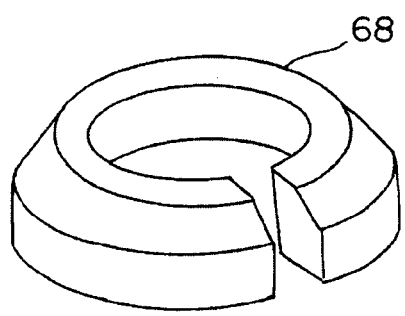
FIG. 10B is a perspective view of a piston ring.

FIG. 10A is a partial vertical sectional view showing an outline of a third embodiment of the vapor tube structure in the gas turbine of the invention, and FIG. 10B is a perspective view of a piston ring.

A vapor tubes 49 of the third embodiment is a vapor tube 51 whose flexible structure is a piston ring structure. The vapor tube 52 of the piston ring structure comprises a first connecting tube 66 fixed to the casing 4, the blade ring 1, the recovery ring 25, a second connecting tube 67 fixed to the cooling recovery ring 38 by a bolt, and three piston rings 68 interposed between the first connecting tube 66 and the second connecting tube 67.

Three annular grooves 69 are provided in an outer periphery of the first connecting tube 66. The piston rings 68 are fitted and fixed into the grooves 69, respectively. The three piston rings 68 resiliently abut against an inner surface of the second connecting tube 67. Metal seals (metal gaskets) 69 are interposed between the second connecting tube 67, the blade ring 1, the recovery ring 25 and the cooling recovery ring 38.

In the vapor tube 52 of the piston ring structure of the first embodiment, if the piston rings 68 fixed to the casing 4 resiliently abut against the blade ring 1, the recovery ring 25, and an inner periphery of the second connecting tube 67 fixed to the cooling recovery ring 38, it is possible to absorb and follow the thermal expansion/contraction difference in an axial direction of the rotor 6 (diametrical direction of the vapor tube 52) X, a diametrical direction of the rotor 6 (axial direction of the vapor tube 52) Y and a circumferential direction of the rotor 6 (diametrical direction of the vapor tube 52 and direction perpendicular to a paper sheet of FIG. 10A).

As a result, the third embodiment can achieve substantially the same working effect as those of the first and second embodiments.

Figure 11:
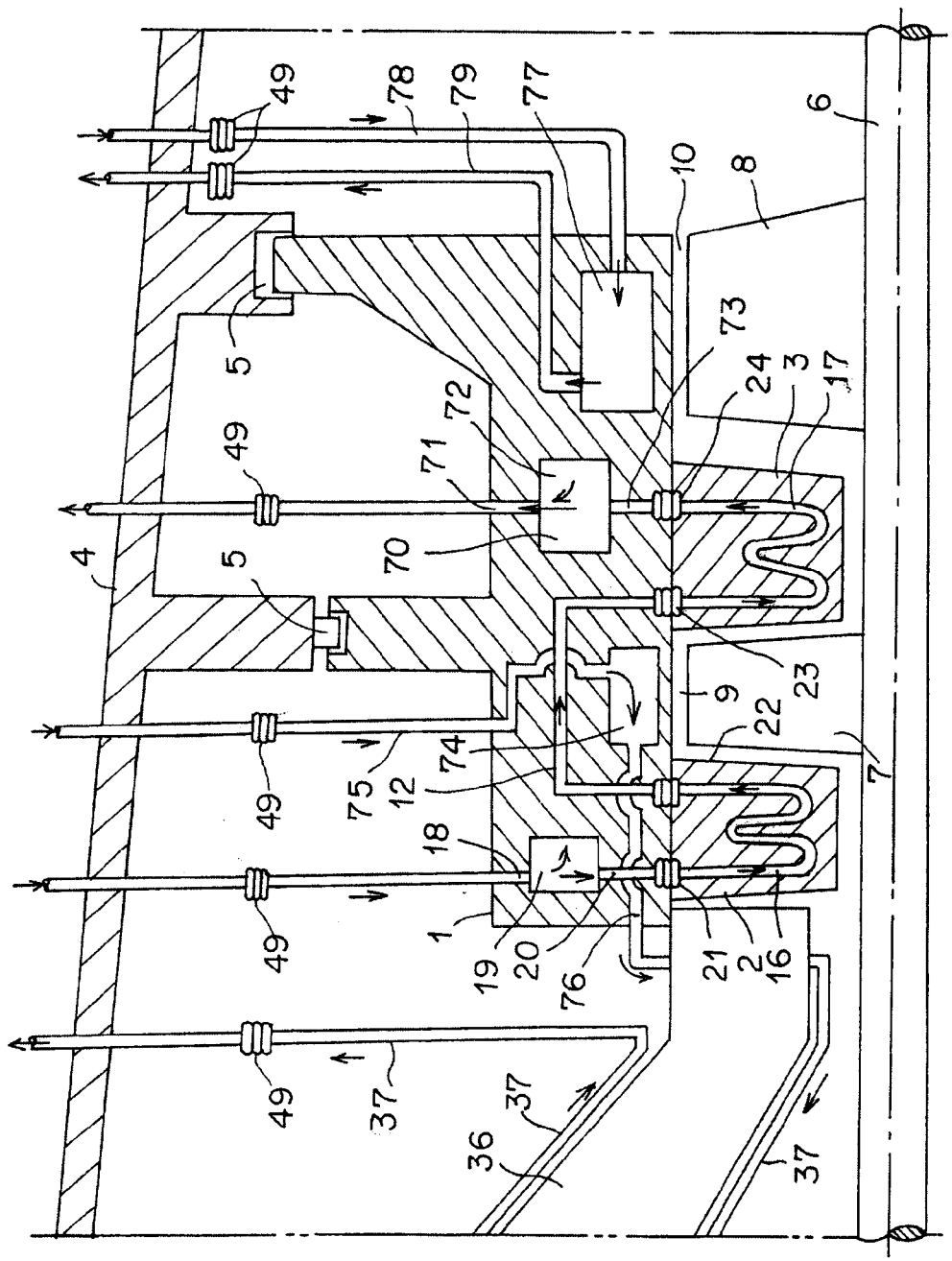
FIG. 11 is a partial sectional view showing an outline of a modification of the gas turbine.
Figure 12:
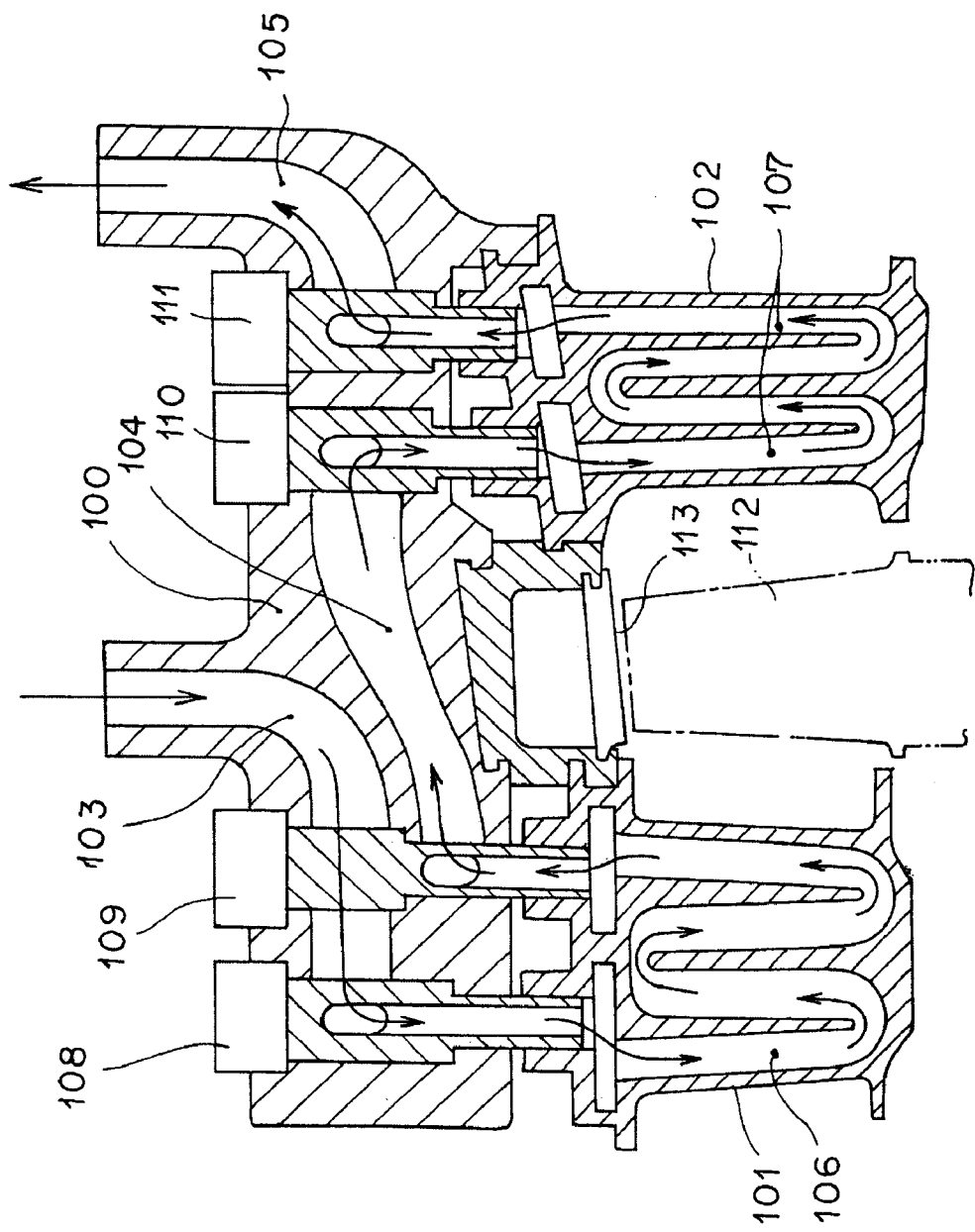
FIG. 12 is a partial vertical sectional view showing an outline of a conventional vapor tube structure in a gas turbine.

A modification of the gas turbine will now be explained. FIG. 11 is a partial vertical sectional view showing an outline of a modification of the gas turbine.

In the modification of the gas turbine, the recovery ring 25 of the gas turbine is integrally formed with the blade ring 1. That is, a recovery passage 70 is provided in the blade ring 1. Although the recovery passage 70 is different from the above structure in the supplying side and the recovering side, the recovery passage 70 has substantially the same structure of the supply passage 11 (see FIG. 2) of the gas turbine.

The recovery passage 70 is of a manifold structure comprising two recovery port passages 71, one recovery communication passage 72 and 16 recovery branch passages 73 provided in the blade ring 1 of the semi-annular shape. The recovery branch passages 73 and the cooling passage 17 of the rear stage stationary blade 3 are connected to each other through the fourth flexible connecting tube 24.

In this modification of the gas turbine, temperature measuring unit is provided in any of the one through passages comprising the supply branch passage 20, the cooling passage 16, the communication passage 12, the cooling passage 17 and the recovery branch passages 73.

In this modification of the gas turbine, the warming/cooling passage 14, the cooling recovery ring 38 and the warming passage 15 of the gas turbine are made into a structure other than the manifold structure. That is, eight warming/cooling passages 74 are provided in the semi-annular shaped blade ring 1, and warming/cooling inlet tubes 75 and warming/cooling outlet tubes 76 are connected to the warming/cooling passages 74.

The 16 warming/cooling outlet tubes 76 and 16 transition pipe cooling tubes 37. The 16 cooling tube 37 and warming/cooling inlet tube 75 are disposed outside the casing 4 through the vapor tubes 49 of the flexible structure.

On the other hand, one or more warming passages 77 are provided in the blade ring 1, and a warming inlet tube 78 and a warming outlet tube 79 are connected to the warming passages 77. One or more warming inlet tubes 78 and the warming outlet tubes 79 are disposed outside the casing 4 through the vapor tubes 49 of the flexible structure.

The modification of the gas turbine can achieve substantially the same working effect as that of the above-described gas turbine.

In each of the first to third embodiments, the blade ring 1 is of the integral structure. The gas turbine of the present invention can also be used for a gas turbine separately provided with the blade ring.

In each of the first to third embodiments, the warming vapor with respect to the front rotor blade 8 and cooling vapor with respect to the transition pipe 36 are handled as common objects. The vapor tube structure in the gas turbine of the invention can also be used for a gas turbine in which the warming vapor with respect to the front rotor blade 8 and cooling vapor with respect to the transition pipe 36 are separately handled.

As apparent from the above description, the present invention provides a vapor tube structure in a gas turbine disposed between a casing and a member-to-be-supported supported by the casing, comprising a first connecting tube fixed to the casing, a second connecting tube fixed to the member-to-be-supported, and a flexible structure provided between the first connecting tube and the second connecting tube. As a result, since it is possible to absorb and follow the thermal expansion/contraction difference between the member-to-be-supported and the casing, it is possible to prevent vapor from leaking from the vapor tube disposed between the member-to-be-supported and the casing.

Moreover, the flexible structure is a bellows structure, a tube seal structure and a piston ring structure, respectively. As a result, the structure is simple. Further, since it is possible to absorb and follow the thermal expansion/contraction difference in an axial direction, a diametrical direction and a circumferential direction of the vapor tube, it is possible to reliably prevent vapor from leaking.

Furthermore, even if the blade ring is of the integral structure which is adversely prone to be largely affected by thermal deformation, it is possible to reliably absorb and follow the thermal expansion/contraction difference between the casing and the blade ring, and it is possible to reliably prevent vapor from leaking from the vapor tube.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A vapor tube structure in a gas turbine, comprising:
   a casing;
   a blade ring supported by the casing, the blade ring including:
   a front section having a plurality of front stage stationary blades attached thereto, and
   a rear section having a plurality of rear stage stationary blades attached thereto,
   wherein the front section and the rear section are one piece; and
   at least one first connecting tube fixed to said casing, at least one second connecting tube fixed to said blade ring, and a flexible structure provided between said first connecting tube and said second connecting tube.

2. The vapor tube structure according to claim 1, wherein said flexible structure is a bellows structure.

3. The vapor tube structure according to claim 1, wherein said flexible structure is a tube seal structure.

4. The vapor tube structure according to claim 1, wherein said flexible structure is a piston ring structure.

* * * * *